United States Patent [19]

Onohara et al.

[11] Patent Number: 4,647,998
[45] Date of Patent: Mar. 3, 1987

[54] TRANSDUCER HEAD ASSEMBLY

[75] Inventors: Akira Onohara, Chichibu; Toru Wakazawa, Yokoze, both of Japan

[73] Assignee: Canon Denshi Kabushiki Kaisha, Chichibu, Japan

[21] Appl. No.: 511,865

[22] Filed: Jul. 6, 1983

[30] Foreign Application Priority Data

Jul. 21, 1982 [JP] Japan .............................. 57-109480[U]
Jul. 21, 1982 [JP] Japan .............................. 57-109481[U]
Jul. 21, 1982 [JP] Japan .............................. 57-109482[U]
Aug. 30, 1982 [JP] Japan .............................. 57-129761[U]

[51] Int. Cl.⁴ .............................................. G11B 5/54
[52] U.S. Cl. ...................................... 360/105; 360/104; 360/99
[58] Field of Search ...................... 360/105, 104, 97–99

[56] References Cited

U.S. PATENT DOCUMENTS

| 3,713,121 | 1/1973 | Fasano et al. | 360/105 |
| 3,769,467 | 10/1973 | Gabor | 360/106 |
| 3,946,439 | 3/1976 | Castrodale et al. | 360/105 |
| 4,137,555 | 1/1979 | Sveceny | 360/129 |
| 4,306,260 | 12/1981 | Maeda et al. | 360/105 |
| 4,379,316 | 4/1983 | Krane | 360/105 |

FOREIGN PATENT DOCUMENTS

| 1042257 | 4/1956 | Fed. Rep. of Germany | 360/104 |
| 58-12169 | 1/1983 | Japan | 360/104 |
| 81/01071 | 4/1981 | PCT Int'l Appl. | 360/104 |

OTHER PUBLICATIONS

Grometer et al., "Compliant Head Mounting", IBM Technical Disclosure Bulletin, vol. 5, No. 1, Jun. 1962, p. 34.

Primary Examiner—John H. Wolff
Assistant Examiner—Matthew J. Bussan
Attorney, Agent, or Firm—Spencer & Frank

[57] ABSTRACT

A magnetic recording/reproducing unit comprises a magnetic head for recording or reproducing information on or from a magnetic recording medium, a pushing member provided opposite the magnetic head via the magnetic recording medium for pushing the magnetic recording medium to the magnetic head, a housing for accommodating the magnetic head, and an elastic member arranged between the magnetic head and the housing for elastically supporting the magnetic head. Even if the pushing member collides with the magnetic head via the magnetic recording medium in the recording or reproducing mode, the shock of the collision is absorbed and a spacing loss between the magnetic head and the magnetic recording medium is suppressed.

4 Claims, 6 Drawing Figures

TRANSDUCER HEAD ASSEMBLY

BACKGROUND OF THE INVENTION

1. Field of the Invention

The present invention relates to a magnetic recording/reproducing unit which records or reproduces information on or from a magnetic recording medium such as a floppy disc which is supported between a magnetic head and a pushing member.

2. Description of the Prior Art

The magnetic recording/reproducing unit of this kind, for instance, a floppy disc unit, for magnetic recording or reproducing information on or from a magnetic recording medium or a floppy disc has widely been used for external storage in computer systems.

FIG. 1 shows an example of a prior art magnetic recording/reproducing unit. The magnetic recording/reproducing unit comprises magnetic heads 1 and 5 for recording or reproducing information on or from a lower surface (so-called 0-surface) and an upper surface (so-called 1-surface) of a floppy disc 4, respectively. These magnetic heads 1 and 5 record or reproduce information on or from both surfaces of the floppy disc 4.

The magnetic heads 1 and 5 are defined as a 0-surface head 1 and a 1-surface head 5, respectively. The 0-surface head 1 is fixedly attached to a housing 2 fixedly mounted on a supporting member 6 by an adhesive 3. The 1-surface head 5 is attached to a head arm 7 of which an end (not illustrated) is to be rotatably supported to a base, so that the 1-surface head 5 may be displaced to a position opposite to the 0-surface head 1 in a head loading mode in which the magnetic recording/reproducing unit records or reproduces information on or from the floppy disc 4, the head arm 7 rotates in a direction Y, so that the 1-surface head 5 pushes the floppy disc 4 to the 0-surface head 1. The magnetic head 5 and the arm 7 together form a pushing member. The floppy disc 4 is clamped between a 0-surface head 1 and the 1-surface head 5, and then the magnetic recording/reproducing unit is enabled to record or reproduce information on or from both surfaces of the floppy disc 4.

In such the prior art magnetic recording/reproducing unit, however, the 0-surface head 1 is rigidly attached to the housing 2 by the adhesive material 3 etc. In addition, the housing 2 is also fixedly mounted to the supporting member 6. Therefore, the 1-surface head 5 collides with the 0-surface head 1 via the floppy disc 4 in the head loading mode, so that a large impact force acts on the heads 1 and 5. If such a collision is repeated, not only the performances of the heads 1 and 5 are deteriorated, but also the heads 1 and 5 are likely to be broken.

In order to reduce the disadvantages of the prior art magnetic recording/reproducing unit, proposed is another type of prior art magnetic recording/reproducing unit shown in FIG. 2. The magnetic recording/reproducing unit comprises a housing 12 for accommodating the 0-surface head 1. The housing 12 is connected to a long arm member 13 as a cantilever. Preferably, the arm member 13 may be an integral part of the housing 12. Another end of the arm member 13 is fixedly supported by a supporting member 16.

In the magnetic recording/reproducing unit, when the 1-surface head 5 collides with the 0-surface head 1 via the floppy disc 4 in the head loading mode, an impact force deflects the arm member 13 in the direction Y, so that the collision is absorbed by the displacement of the 0-surface head 1 in the direction Y. The arm member 13 thus deflected is rebounded in the direction Y' by the resilience stored in the arm member 13 itself to reach its home position at which the arm member 13 is not deflected after oscillating. Following the movement of the arm member 13, the 0-surface head 1 also reaches its home position at which exact recording or reproducing is performed after oscillating upwardly and downwardly. After both the head 1 and the arm member 13 are stabilized at their home positions, exact recording/reproducing may be carried out.

In the prior art magnetic recording/reproducing unit, however, the arm member 13 is long, and consequently the amplitude of the oscillation of the 0-surface head 1 is large after the collision. Therefore, it takes a long time until the oscillation of the arm member 13 is attenuated so that the 0-surface head 1 is stabilized at its home position.

Until the 0-surface head 1 stably takes its home position, a spacing loss is produced between the 0-surface head 1 and the floppy disc 4, so that exact recording or reproducing cannot be attained.

SUMMARY OF THE INVENTION

With the above in view, it is an object of the present invention to provide a magnetic recording/reproducing unit which obviates the disadvantages of the prior art described above.

It is another object of the present invention to provide a magnetic recording/reproducing unit which can buffer a collision of a magnetic head and a pushing member to ensure exact and stable recording/reproducing operations.

It is a further object of the present invention to provide a magnetic recording/reproducing unit which can suppress a spacing loss between a magnetic head and a magnetic recording medium to ensure exact and stable recording/reproducing operation.

In order to attain these objects, a magnetic recording/reproducing unit comprises according to one aspect of the present invention, a magnetic head for recording or reproducing information on or from a magnetic recording medium, a pushing member provided on the opposite position of the magnetic head via the magnetic recording medium and for pushing the magnetic recording medium to the magnetic head, a housing for accommodating the magnetic head, and an elastic member arranged between the magnetic head and the housing for elastically supporting the magnetic head.

In a first preferred embodiment of the invention, a 0-surface magnetic head is attached to the housing by elastomeric adhesive.

In a second preferred embodiment of the invention, a 0-surface magnetic head is mounted to the housing by an elastic member in the form of a sheet.

In a third preferred embodiment of the invention, a 0-surface magnetic head is mounted to elastic mounting portions which are integral parts of the housing.

In a second aspect of the present invention, a magnetic recording/reproducing unit comprises a magnetic recording/reproducing unit comprises according to one aspect of the present invention, a magnetic head for recording or reproducing information on or from a magnetic recording medium, a pushing member provided on the opposite position of the magnetic head via the magnetic recording medium and for pushing the magnetic recording medium to the magnetic head, an arm member having a housing for accommodating the magnetic head, a supporting member for fixedly supporting one end of the arm member, and an elastic member for elastically supporting the arm member.

Preferably, the arm member may be a cantilever. It is preferable that the supporting member has a supporting arm for fixedly supporting the one end of the cantilever and a base arm extended in parallel with the cantilever. The elastic member may preferably be arranged between the cantilever and the supporting member in order to rapidly damp the oscillation caused by the collision between the pushing member and the magnetic head.

DETAILED DESCRIPTION OF PREFERRED EMBODIMENTS

Figure 1:
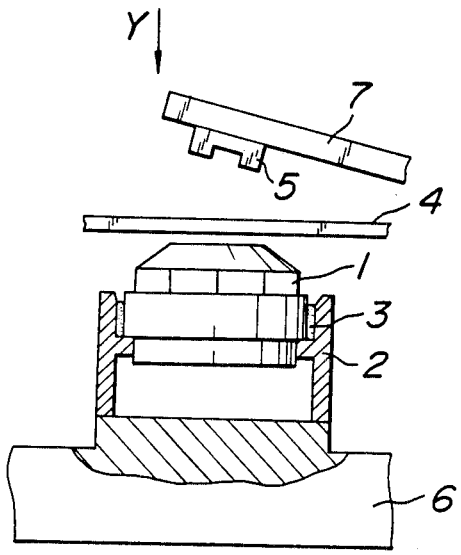
FIG. 1 is a front view, partly in cross section, showing an example of a substantial part of a conventional magnetic recording/reproducing unit.
Figure 3:
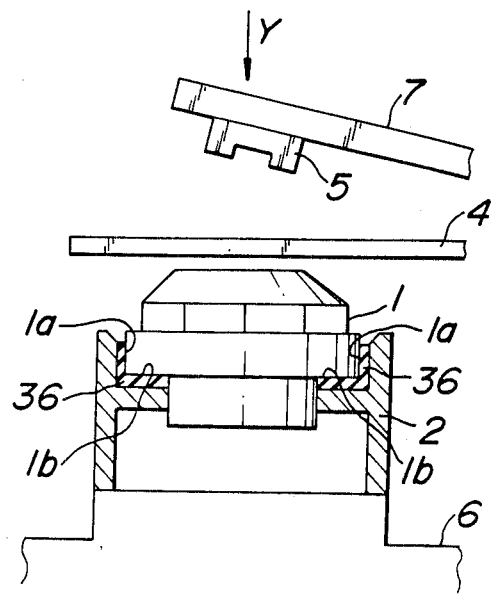
FIG. 3 is a front view, partly in cross section, showing a first embodiment of a substantial part of a magnetic recording/reproducing unit according to the present invention.

FIG. 3 shows a first embodiment of a magnetic recording/reproducing unit according to the present invention. In this figure, parts corresponding to those shown in FIG. 1 are depicted by the same reference numerals.

In the embodiment, a 0-surface head 1 is secured to a housing 2 by the adhesion of elastomeric adhesive 36. That is, the side 1a and the base 1b of a fitting portion of the 0-surface head 1 are adhesively secured to the housing 2 by the elastomeric adhesive 36.

The elastomeric adhesive 36 consists at least of one of natural rubber, chlorinated rubber, rubber hydrochloride, cyclorubber, maleic rubber, graft rubber, reclaimed rubber, neoprene, nitrile rubber, styrene-butadiene rubber (SBR), butadiene-vinylpyridine rubber, butadiene-styrene-vinylpyridine rubber, butyl rubber, polyisobutylene, polysulfide rubber, carboxylic rubber, and silicone rubber.

A 1-surface head 5 which is opposite to the 0-surface head 1 cooperates with the 0-surface head 1 to hold a floppy disc 4 therebetween in the head loading mode, so that information is recorded or reproduced on or from the both surfaces of the floppy disc 4.

In the embodiment, in the head loading mode, the 1-surface head 5 moves in the direction Y to push the floppy disc 4. Then, when the 1-surface head 5 collides with the 0-surface head 1 via the floppy disc 4, the elastomeric adhesive 36 is compressed by an impact force generated by the collision and consequently the 0-surface head 1 moves backward in the direction Y, so that the shock of the collision is absorbed. Thereafter, the 0-surface head 1 is returned to its home position instantaneously by a resilient reaction of the elastomeric adhesive 36. Thus, exact recording or reproducing is enabled.

Figure 4:
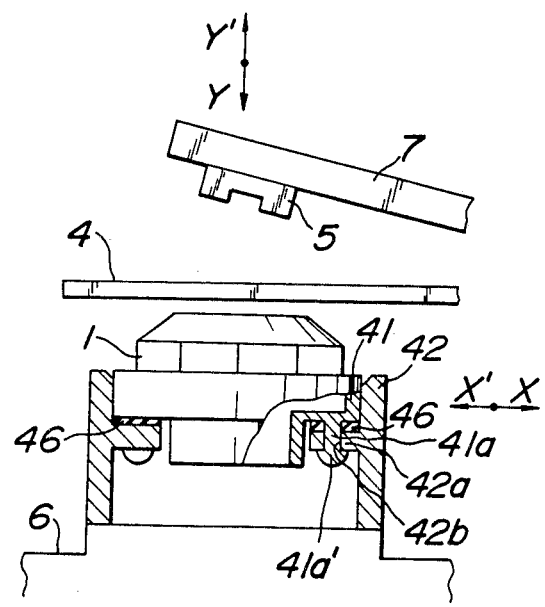
FIG. 4 is a front view, partly in cross section, showing a second embodiment of a substantial part of a magnetic recording/reproducing unit according to the present invention.

FIG. 4 shows a second embodiment of a magnetic recording/reproducing unit according to the present invention. In this figure, parts corresponding to those shown in FIG. 1 are depicted by the same reference numerals.

In the embodiment, the 0-surface head 1 is accommodated in a housing 42 and is mounted on an inner flange 42a protruding from the inner surface of the housing 42.

In more detail, a mounting portion 41 of the 0-surface head 1 has a plurality of protrusions 41a which are fitted in holes 42b formed in the inner flange 42a of the housing 42. Here, an elastic member 46 in the form of sheet made of rubber, polyurethane sponge such as Moltoplen (a trademark of Bayer), or synthetic resin etc. is inserted between the mounting portion 41 of the 0-surface head 1 and the inner flange 42a.

Top ends 41a' of the protrusions 41a which protrude from the underside of the inner flange 42a are caulked, so that the 0-surface head 1 is mounted to the housing 42 via the protrusions 41a, the holes 42a and the elastic member 46, in a movable manner in the directions Y and Y'.

The 1-surface head 5 which is opposite to the 0-surface head 1 cooperates with the 0-surface head 1 to hold the floppy disc 4 therebetween in the head loading mode, so that information is recorded or reproduced on or from the both surfaces of the floppy disc 4.

In the embodiment, in the head loading mode, the 1-surface head 5 moves in the direction Y to push the floppy disc 4. Then, when the 1-surface head 5 collides with the 0-surface head 1 via the floppy disc 4, the elastic member 46 is compressed by an impact force generated by the collision and consequently the 0-surface head 1 moves backward in the direction Y, so that the shock of the collision is absorbed. The 0-surface head 1 is returned to its home position instantaneously by a resilient reaction of the elastic member 46 without the displacement thereof in the directions X and X', since the protrusions 41a are guided by holes 42a. Thus, exact recording or reproducing is enabled.

While in the embodiment, the top ends 41a' of the protrusions 41a are caulked, so that the protrusions 41a are movably fitted in the holes 42a, various conventional method may be used. For example, flanges or screws may be firmly attached to the top ends 41a'.

Figure 5:
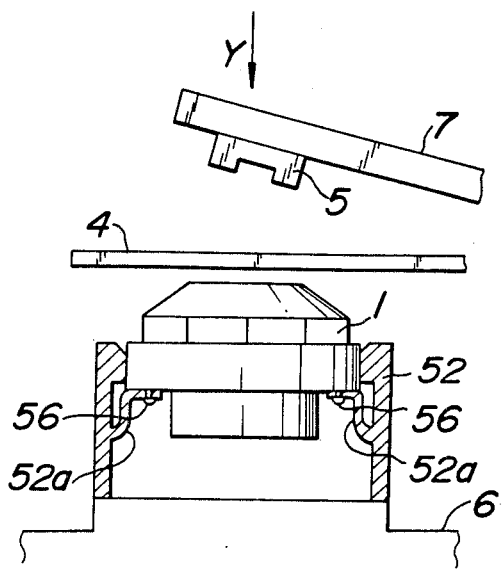
FIG. 5 is a front view, partly in cross section, showing a third embodiment of a substantial part of a magnetic recording/reproducing unit according to the present invention.

FIG. 5 shows a third embodiment of a magnetic recording/reproducing unit according to the present invention. In this figure, parts corresponding to those shown in FIG. 1 are depicted by the same reference numerals.

In the embodiment, the 0-surface head 1 is accommodated in a housing 52 and is fixedly mounted to elastic mounting portions 52a, which are provided on the inner surface of the housing 52, by screws 56. The mounting portions 52a may be integral parts of the housing 52.

The 1-surface head 5 which is opposite to the 0-surface head 1 cooperates with the 0-surface head 1 to hold the floppy disc 4 therebetween in the head loading mode, so that information is recorded or reproduced on or from the both surfaces of the floppy disc 4.

In the embodiment, in the head loading mode, the 1-surface head 5 moves in the direction Y to push the floppy disc 4. Then, when the 1-surface head 5 collides with the 0-surface head 1 via the floppy disc 4, the elastic mounting portions 52a are deflected by an impact force due to the collision in the direction Y, so that the shock of the collision is absorbed. The 0-surface head 1 is returned to its home position instantaneously by a resilient reaction of the elastic mounting portions 52a. Thus, exact recording or reproducing is enabled.

While in the embodiment, the 0-surface head 1 is mounted to the elastic mounting portions 52a in the housing 52 by the screws 56, the 0-surface head 1 may be fixed to the elastic mounting portions 52a by adhesive etc.

Figure 2:
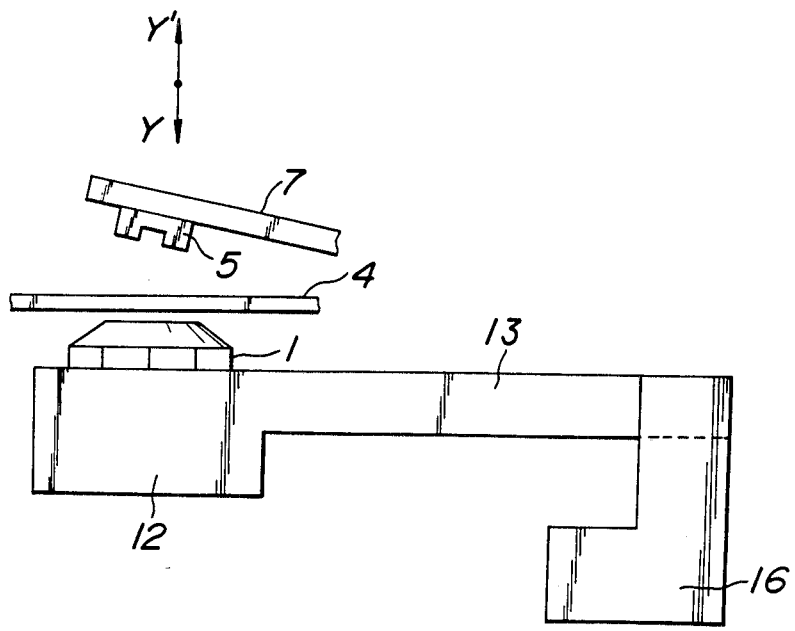
FIG. 2 is a front view showing another example of a substantial part of a formerly proposed magnetic recording/reproducing unit.
Figure 6:
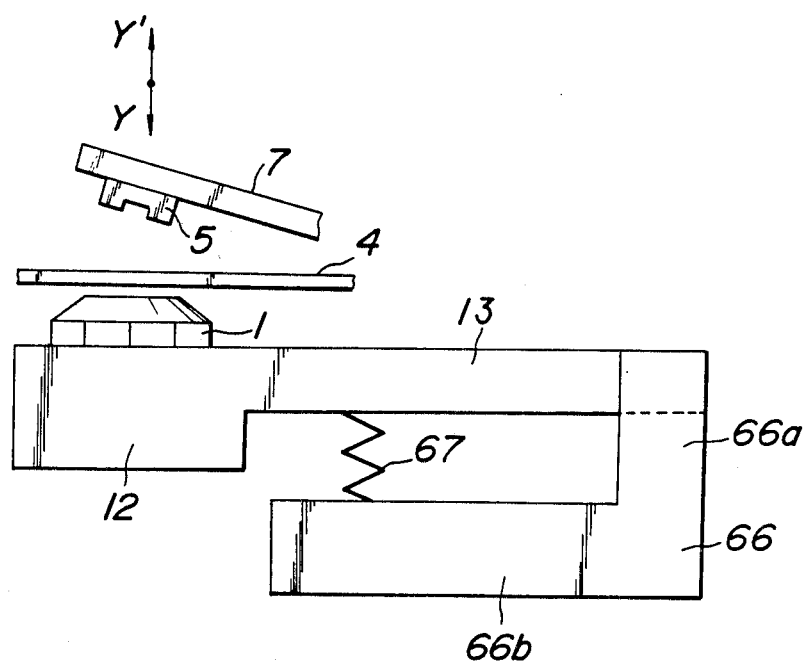
FIG. 6 is a front view showing a fourth embodiment of a substantial part of a magnetic recording/reproducing unit according to the present invention.

FIG. 6 shows a fourth embodiment of a magnetic recording/reproducing unit according to the present invention. In this figure, parts corresponding to those shown in FIG. 2 are depicted by the same reference numerals.

In the embodiment, the end of the arm member 13 opposite to the housing 12 is secured to the top end of a crossarm as a supporting arm 66a of a supporting member 66 substantially in the form of an L, so that the top end fixedly supports the end of the arm member 13. The supporting member 66 has another crossarm as a base arm 66b fixed to a base (not illustrated) and extended substantially in parallel with the arm member 13. That is, the 0-surface head 1 mounted to the housing 12 is supported by the supporting member 66 via the arm member 13 as a cantilever. In the embodiment, in order to rapidly damp the oscillation caused by the collision between the 1-surface head 5 and the 0-surface head 1, a spring 67 as an elastic member is extended between the underside of the arm member 13 and the base arm 66b and in the vicinity of the 0-surface head 1 rather than the supporting arm 66a.

The 1-surface head 5 which is opposite to the 0-surface head 1 cooperates with the 0-surface head 1 to hold the floppy disc 4 therebetween in the head loading mode, so that information is recorded or reproduced on or from the both surfaces of the floppy disc 4.

In the embodiment, in the head loading mode, the 1-surface head 5 moves in the direction Y to push the floppy disc 4. Then, when the 1-surface head 5 collides with the 0-surface head 1 via the floppy disc 4, the arm member 13 is deflected by an impact force due to the collision while the spring 67 is compressed in the direction Y, so that the 0-surface head 1 moves downwardly and that the shock of the collision is absorbed. The arm member 13 thus deflected is rebounded in the direction Y' by resilient forces of the arm member 13 itself and the spring 67. In this manner, the arm member 13 resumes its home position after the repetition of the oscillation in the directions Y and Y'. In the initial movement in the directions Y and Y' and the following oscillation of the arm member 13, the amplitude of the arm member 13 is restrained by the spring 67. Accordingly, the oscillation of the arm member 13 is damped faster than the magnetic recording/reproducing unit shown in FIG. 2, so that the arm member 13 is stabilized at its home position rapidly. Therefore, the 0-surface head 1 mounted to the arm member 13 is stabilized at its home position rapidly, so that the 0-surface head 1 exactly records or reproduces information on or from the floppy disc 4.

While in the embodiment, the spring 67 is provided between the arm member 13 and the base arm 66b of the supporting member 66, another elastic member, for instance, rubber or sponge etc. may be used instead of the spring 67.

As mentioned above, a magnetic recording/reproducing unit according to the present invention absorbs the collision of a pressing member with a magnetic head in a head loading mode and the magnetic head resumes its home position of recording/reproducing, so that the deterioration and destruction of the magnetic head are prevented. In addition, a spacing loss between the magnetic head and a magnetic recording medium is suppressed, and therefore, exact recording/reproducing is realized.

What is claimed is:

1. A transducer head assembly comprising:
    a magnetic head for recording and reproducing information on and from a magnetic recording medium;
    a pushing member spaced from said magnetic head, said magnetic recording medium being interposed between said magnetic head and said pushing member, said magnetic recording medium being pushed against said magnetic head by said pushing member;
    a housing having an inner surface defining a space for accommodating said magnetic head, said housing having a longitudinal axis; and
    elastic mounting portions made of the same material as that of said housing and integrally molded with said housing at the inner surface thereof, said elastic mounting portions being deflectable in the direction of the longitudinal axis of said housing, said magnetic head being fixedly mounted on said elastic housing portions and elastically supported thereby.

2. A transducer head assembly as claimed in claim 1 wherein each of said elastic mounting portions has a flange portion extending inwardly with respect to the inner surface of said housing, said magnetic head being secured to said flange portion for deflection in the direction of the longitudinal axis of said housing.

3. A transducer head assembly comprising:
    a first magnetic head for recording and reproducing information on and from one surface of a magnetic recording medium;
    a second magnetic head for recording and reproducing information on and from the other surface of said magnetic recording medium, said recording medium being interposed between said first and second magnetic heads;
    a head arm for supporting said first magnetic head, said head arm pushing said first magnetic head against said recording medium;
    a housing having an inner surface defining a space for accommodating said second magnetic head, said housing having a longitudinal axis; and
    elastic mounting portions made of the same material as that of said housing and integrally molded with said housing at the inner surface thereof, said elastic mounting portions being deflectable in the direction of the longitudinal axis of said housing, said second magnetic head being fixedly mounted on said elastic housing portions and elastically supported thereby.

4. A transducer head assembly as claimed in claim 3, wherein each of said elastic mounting portions has a flange portion extending inwardly with respect to the inner surface of said housing, said second magnetic head being secured to said flange portion for deflection in the direction of the longitudinal axis of said housing.

* * * * *